United States Patent

Hocken et al.

[11] Patent Number: 6,051,155
[45] Date of Patent: Apr. 18, 2000

[54] PREPARATIONS CONTAINING WAX

[75] Inventors: Jörg Hocken, Meerbusch; Wolf-Rüdiger Karl, Duisburg; Klaus Schulte, Alpen, all of Germany

[73] Assignee: Metallgesellschaft Aktiengesellschaft, Frankfurt am Main, Germany

[21] Appl. No.: 09/341,108

[22] PCT Filed: Jan. 13, 1998

[86] PCT No.: PCT/EP98/00160

§ 371 Date: Aug. 17, 1999

§ 102(e) Date: Aug. 17, 1999

[87] PCT Pub. No.: WO98/31758

PCT Pub. Date: Jul. 23, 1998

[30] Foreign Application Priority Data

Jan. 15, 1997 [DE] Germany .......................... 197 01 012

[51] Int. Cl.[7] .............................. C14C 9/02; C08L 91/06; A01N 27/00
[52] U.S. Cl. ........................ 252/8.57; 106/10; 106/18.29; 106/272
[58] Field of Search .................... 106/18.29, 10, 106/272; 252/8.57

[56] References Cited

U.S. PATENT DOCUMENTS

| 5,250,289 | 10/1993 | Boothroyd et al. | 424/59 |
| 5,911,974 | 6/1999 | Brieva et al. | 424/64 |

FOREIGN PATENT DOCUMENTS 3824999  2/1989  Germany .

OTHER PUBLICATIONS

Chemical Abstract No. 109:24320, abstract of Japanese Patent Specification No. 63–066273 (Mar. 1988).
Patent Abstract of Japan, vol. 012, No. 297 (C–519) Aug. 12, 1988 & JP 63 066273 A (Idemitsu Kosan Co Ltd), Mar. 25, 1988.

*Primary Examiner*—Anthony Green
*Attorney, Agent, or Firm*—Norris, McLaughlin & Marcus, P.A.

[57] ABSTRACT

Wax-containing preparation for treating wood and leather surfaces, comprising very fine transparent titanium dioxide particles with a crystallite size of between 5 and 50 nm offer long-term protection of wood and leather surfaces against the harmful effects of light at wavelengths between 280 and 800 nm.

5 Claims, No Drawings

PREPARATIONS CONTAINING WAX

DESCRIPTION

This invention relates to preparations containing wax for the treatment of wooden and leather surfaces.

Wax-containing preparations in the form of solvent-based pastes, free-flowing powders, dispersions in organic solvents, liquid or pasty emulsions with or without solvent, mixtures with synthetic materials or wax aerosols are known for preserving wooden and leather surfaces.

According to their origin the waxes are divided into three groups:

1. Natural waxes, which include vegetable waxes, animal waxes, mineral waxes and petrochemical waxes,
2. chemically modified waxes, which include in particular the hard waxes,
3. synthetic waxes.

As far as these waxes are used for preserving wooden or leather surfaces, they do not offer protection against the damaging influence of visible and short-wave light of the U.V. range of wavelengths from 280 to 800 nm, so that the surfaces of wooden furniture, leather seating furniture, leather shoes, leather bags and leather clothing become discolored already after a relatively short period while they are being exhibited and stored or during usage. Organic absorbents are not very effective, because the preparations containing wax are applied only in relatively thin layers on wooden and leather surfaces; moreover, most of the organic absorbents are not without health hazards.

It is the object of the present invention to provide preparations containing wax for the treatment of wooden and leather surfaces, which preparations ensure a permanent protection against the damaging effect of light rays in the range of wavelengths from 280 to 800 nm.

This object is solved in that the wax-containing preparations have a content of micronized transparent titanium dioxide with a crystallite size of 5 to 50 nm. Such preparations provide for a long-term protection of wooden and leather surfaces against the damaging influence of visible and shortwave light of the U.V. range of wavelengths from 280 to 800 nm. The titanium dioxide particles can be stirred easily into the molten wax-containing preparations of low viscosity and in doing so are distributed homogeneously. In addition, the titanium dioxide particles can easily be dispersed in liquid emulsions.

One preferred aspect of the invention should be seen in that the content of micronized titanium dioxide is 0.05 to 20 wt-%. This is an advantageous content of titanium dioxide, which ensures a sufficient stability against light radiation of the U.V.-A and U.V.-B ranges.

The titanium dioxide particles may include an inorganic doping.

The titanium dioxide particles may also be subjected to an advantageous doping with alumina or zirconia. The doping of the titanium dioxide particles improves the weather resistance.

An organic coating of the titanium dioxide particles enhances their wettability and dispersibility.

Subject-matter of the invention also is the use of the wax-containing preservatives, where as titanium dioxide its rutile modification is used to preserve wooden and leather surfaces located in open rooms or outside, i.e. which are exposed directly to atmospheric influences.

As regards the preservation of the surfaces of wooden and leather articles accommodated in closed rooms, it was found to be advantageous when the titanium dioxide particles consist of the crystal modification anatase.

The invention will subsequently be described in detail with reference to a comparative embodiment.

A commercially available furniture wax (Antikwachs) was applied onto the surface of a first beechwood board. A second beechwood board was coated with a commercially available furniture wax to which 10% of a conventional U.V. absorbent (e.g. benzophenone) had been admixed. Furniture wax, in which 10 wt-% of a finely divided titanium dioxide of the rutile modification with a crystallite size of about 20 nm (according to Scherrer) had been uniformly dispersed; was applied onto the surface of a third beechwood board. Subsequently, the three coated beechwood boards were inserted in a Q.U.V.-quick weathering apparatus which provides for a simulation of the damaging influence of the U.V. light in order to predict the stability against U.V. radiation. The U.V. lamps mainly generate a U.V. light with wavelengths in the range from 280 to 800 nm, i.e. the inserted beechwood boards were exposed to the U.V.-A and U.V.-B radiation. The duration of the irradiation was 100 hours for all three beechwood boards.

The visual inspection of the beechwood boards performed after this period reveals a distinct yellowing of the board treated only with furniture wax as well as of the board treated with furniture wax containing the organic U.V. absorbent. The beechwood board coated with the furniture wax to which the finely divided transparent titanium dioxide of the rutile modification had been added did not show any changes as compared to the original colour. This result is also confirmed by additional reflectance measurements of the three beechwood boards carried out with green filters. The brightness value Ry, which had thus been obtained for the unmodified furniture wax and for the furniture wax to which the conventional U-V. absorbents had been added is about 10% lower than the brightness value of the furniture wax layer in which the micronized transparent titanium dioxide is uniformly dispersed. It can furthermore be noted that the beechwood boards coated with unmodified furniture wax and with furniture wax-modified by the addition of conventional U.V. absorbents show a distinct yellow tinge as compared to the beechwood board coated with furniture wax containing titanium dioxide.

The term "wax-containing preparations" also includes polishes.

We claim:

1. Wax-containing preparations for the treatment of wooden and leather surfaces, having a content of micronized transparent titanium dioxide particles with a crystallite size of 5 to 50 nm and wherein the titanium dioxide particles are doped with alumina or zirconia.

2. The wax-containing preparations as claimed in claim 1, wherein said titanium dioxide is present in an amount of from 0.5 to 20 wt-%.

3. The wax-coating preparations according to claim 1, wherein the surface of the titanium dioxide particles has an organic coating to enhance their wettability and dispersibility.

4. The wax-coating preparations according to claim 1, wherein the titanium dioxide particles are in the rutile form.

5. The wax-containing preparations according to claim 1, wherein the titanium dioxide particles are in the anatase form.

* * * * *